(12) United States Patent
Abedini et al.

(10) Patent No.: US 11,849,495 B2
(45) Date of Patent: Dec. 19, 2023

(54) PRE-CONFIGURING PARAMETER SETS FOR SERVING-NODE-AWARE CONNECTION MODES

(71) Applicant: QUALCOMM Incorporated, San Diego, CA (US)

(72) Inventors: Navid Abedini, Basking Ridge, NJ (US); Wanshi Chen, San Diego, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 79 days.

(21) Appl. No.: 17/544,763

(22) Filed: Dec. 7, 2021

(65) Prior Publication Data

US 2023/0180312 A1  Jun. 8, 2023

(51) Int. Cl.
*H04W 76/14* (2018.01)
*H04W 72/23* (2023.01)
*H04W 88/06* (2009.01)

(52) U.S. Cl.
CPC .......... *H04W 76/14* (2018.02); *H04W 72/23* (2023.01); *H04W 88/06* (2013.01)

(58) Field of Classification Search
CPC ...... H04W 76/14; H04W 72/23; H04W 88/06
USPC ...................................... 455/452.1
See application file for complete search history.

(56) References Cited

U.S. PATENT DOCUMENTS

| | | | |
|---|---|---|---|
| 2016/0198455 A1* | 7/2016 | Caretti | H04W 72/21 370/329 |
| 2021/0307083 A1* | 9/2021 | Wu | H04W 74/0841 |
| 2021/0377860 A1* | 12/2021 | Ma | H04W 28/0221 |
| 2022/0217743 A1* | 7/2022 | Zhou | H04W 72/1263 |
| 2022/0408504 A1* | 12/2022 | Yilmaz | H04W 28/04 |

FOREIGN PATENT DOCUMENTS

WO    WO-2022194340 A1 *  9/2022

\* cited by examiner

*Primary Examiner* — Hirdepal Singh
(74) *Attorney, Agent, or Firm* — Arun Swain

(57) ABSTRACT

A method for wireless communication performed by a user equipment (UE) includes performing an access procedure to connect with a network comprising multiple wireless network nodes. The method also includes receiving a communication parameter message indicating multiple communication parameter sets based on performing the access procedure. Each communication parameter set may be associated with a single respective connection mode of multiple connection modes, and each connection mode may be associated with one or more respective wireless network nodes of the multiple wireless network nodes. The method also includes receiving signaling configuring the UE to use a connection mode of the multiple connection modes. The method further includes communicating with the one or more wireless network nodes of the multiple wireless network nodes, according to a communication parameter set associated with the connection mode, based on receiving the signaling. The one or more wireless network nodes may be associated with the connection mode.

30 Claims, 9 Drawing Sheets

PRE-CONFIGURING PARAMETER SETS FOR SERVING-NODE-AWARE CONNECTION MODES

FIELD OF THE DISCLOSURE

Aspects of the present disclosure generally relate to wireless communications, and more particularly to pre-configuring parameter sets at a user equipment (UE) for serving-node aware-connection modes.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (for example, bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation.

Some wireless communication systems may include multiple access nodes to provide a specified network capacity while also improving network coverage. The nodes may include one or more base stations, such as sub-6 GHz base stations or millimeter wave (mmWave) base stations, one or more integrated access and backhaul (IAB) nodes, and one or more assisting nodes. The one or more assisting nodes may include one or more repeaters, lower-layer relays, or reflectors. In some examples, the assisting nodes are specified to extend coverage of distributed unit (DU) cells, and may have limited, or no, scheduling capability or medium access control (MAC) functionality. A physical cell identifier (PCID) of an assisting node may be the same as the PCID of a donor cell that is associated with the assisting node.

SUMMARY

In one aspect of the present disclosure, a method for wireless communication by a user equipment (UE) includes performing an access procedure to connect with a network comprising multiple wireless network nodes. The method further includes receiving a communication parameter message indicating multiple communication parameter sets based on performing the access procedure, each communication parameter set being associated with a single respective connection mode of multiple connection modes, and each connection mode being associated with one or more respective wireless network nodes of the multiple wireless network nodes. The method still further includes receiving signaling configuring the UE to use a connection mode of the multiple connection modes. The method also includes communicating with the one or more wireless network nodes of the multiple wireless network nodes, according to a communication parameter set associated with the connection mode, based on receiving the signaling, the one or more wireless network nodes being associated with the connection mode.

Another aspect of the present disclosure is directed to an apparatus including means for performing an access procedure to connect with a network comprising multiple wireless network nodes. The apparatus further includes means for receiving a communication parameter message indicating multiple communication parameter sets based on performing the access procedure, each communication parameter set being associated with a single respective connection mode of multiple connection modes, each connection mode being associated with one or more respective wireless network nodes of the multiple wireless network nodes. The apparatus still further includes means for receiving signaling configuring the UE to use a connection mode of the multiple connection modes. The apparatus also includes means for communicating with the one or more wireless network nodes of the multiple wireless network nodes, according to a communication parameter set associated with the connection mode, based on receiving the signaling, the one or more wireless network nodes being associated with the connection mode.

In another aspect of the present disclosure, a non-transitory computer-readable medium with non-transitory program code recorded thereon is disclosed. The program code is executed by a processor and includes program code to perform an access procedure to connect with a network comprising multiple wireless network nodes. The program code further includes program code to receive a communication parameter message indicating multiple communication parameter sets based on performing the access procedure, each communication parameter set being associated with a single respective connection mode of multiple connection modes, each connection mode being associated with one or more respective wireless network nodes of the multiple wireless network nodes. The program code still further includes program code to receive signaling configuring the UE to use a connection mode of the multiple connection modes. The program code also includes program code to communicate with the one or more wireless network nodes of the multiple wireless network nodes, according to a communication parameter set associated with the connection mode, based on receiving the signaling, the one or more wireless network nodes being associated with the connection mode.

Another aspect of the present disclosure is directed to an apparatus for wireless communications at a UE. The apparatus includes a processor and a memory coupled with the processor. The memory stores instructions operable, when executed by the processor, to cause the apparatus to perform an access procedure to connect with a network comprising multiple wireless network nodes. Execution of the instructions also cause the apparatus to receive a communication parameter message indicating multiple communication parameter sets based on performing the access procedure, each communication parameter set being associated with a single respective connection mode of multiple connection modes, each connection mode being associated with one or more respective wireless network nodes of the multiple wireless network nodes. Execution of the instructions further cause the apparatus to receive signaling configuring the UE to use a connection mode of the multiple connection modes. Execution of the instructions still further cause the apparatus to communicate with the one or more wireless network nodes of the multiple wireless network nodes, according to a communication parameter set associated with the connection mode, based on receiving the signaling, the one or more wireless network nodes being associated with the connection mode.

In one aspect of the present disclosure, a method for wireless communication by a base station includes receiving, from a UE, an access request for access to a network comprising a number of wireless network nodes. The method further includes transmitting, to the UE, a communication parameter message indicating multiple communication parameter sets based on receiving the access request for access, each communication parameter set being associated with a single respective connection mode of a multiple connection modes, each connection mode being associated with one or more respective wireless network nodes of the multiple wireless network nodes. The method still further includes transmitting, to the UE, signaling configuring the UE to use a connection mode of the multiple connection modes. The method also includes communicating, with the UE, according to a communication parameter set associated with the connection mode, based on transmitting the signaling, the base station being associated with the connection mode.

Another aspect of the present disclosure is directed to an apparatus including means for receiving, from a UE, an access request for access to a network comprising a number of wireless network nodes. The apparatus further includes means for transmitting, to the UE, a communication parameter message indicating multiple communication parameter sets based on receiving the access request for access, each communication parameter set being associated with a single respective connection mode of a multiple connection modes, each connection mode being associated with one or more respective wireless network nodes of the multiple wireless network nodes. The apparatus still further includes means for transmitting, to the UE, signaling configuring the UE to use a connection mode of the multiple connection modes. The apparatus also includes means for communicating, with the UE, according to a communication parameter set associated with the connection mode, based on transmitting the signaling, the base station being associated with the connection mode.

In another aspect of the present disclosure, a non-transitory computer-readable medium with non-transitory program code recorded thereon is disclosed. The program code is executed by a processor and includes program code to receive, from a UE, an access request for access to a network comprising a number of wireless network nodes. The program code further includes program code to transmit, to the UE, a communication parameter message indicating multiple communication parameter sets based on receiving the access request for access, each communication parameter set being associated with a single respective connection mode of a multiple connection modes, each connection mode being associated with one or more respective wireless network nodes of the multiple wireless network nodes. The program code still further includes program code to transmit, to the UE, signaling configuring the UE to use a connection mode of the multiple connection modes. The program code also includes program code to communicate, with the UE, according to a communication parameter set associated with the connection mode, based on transmitting the signaling, the base station being associated with the connection mode.

Another aspect of the present disclosure is directed to an apparatus for wireless communications at a base station. The apparatus includes a processor and a memory coupled with the processor. The memory stores instructions operable, when executed by the processor, to cause the apparatus to receive, from a UE, an access request for access to a network comprising a number of wireless network nodes. Execution of the instructions further cause the apparatus to transmit, to the UE, a communication parameter message indicating multiple communication parameter sets based on receiving the access request for access, each communication parameter set being associated with a single respective connection mode of a multiple connection modes, each connection mode being associated with one or more respective wireless network nodes of the multiple wireless network nodes. Execution of the instructions also cause the apparatus to transmit, to the UE, signaling configuring the UE to use a connection mode of the multiple connection modes. Execution of the instructions still further cause the apparatus to communicate, with the UE, according to a communication parameter set associated with the connection mode, based on transmitting the signaling, the base station being associated with the connection mode.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
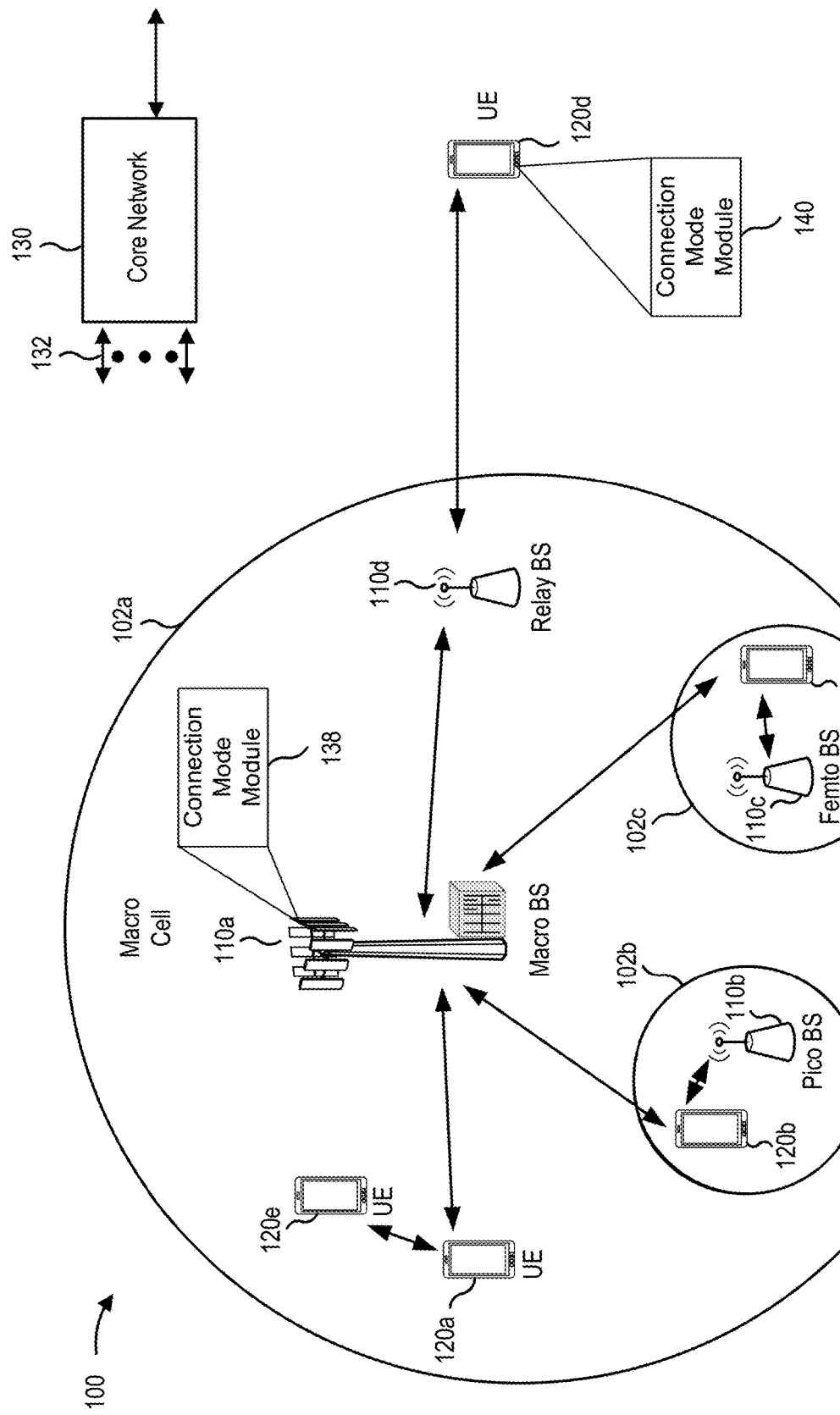
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

Some wireless communication systems may include multiple access nodes to provide a specified network capacity while also improving network coverage. The nodes may include one or more base stations, such as sub-6 GHz base stations or millimeter wave (mmWave) base stations, one or more integrated access and backhaul (IAB) nodes, and one or more assisting nodes. The one or more assisting nodes may include one or more repeaters, lower-layer relays, or reflectors. In some examples, the assisting nodes are specified to extend coverage of distributed unit (DU) cells, and may have limited, or no, scheduling capability or medium access control (MAC) functionality. A physical cell identifier (PCID) of an assisting node may be the same as the PCID of a donor cell that is associated with the assisting node.

In wireless communication systems with multiple wireless network nodes, such as a base station and one or more assisting nodes, a user equipment (UE) may be served by one or more of the multiple wireless network nodes based on an associated connection mode (for example, service configuration) of multiple connection modes. Each connection mode may correspond to a connection between the UE and one or more of the wireless network nodes. For example, in one connection mode, the UE may be served directly by a base station. In another connection mode, the UE may be served by one or more assisting nodes. In yet another connection mode, the UE may be served by both the base station and the one or more assisting nodes when the UE is within coverage of both the base station and the one or more assisting nodes.

Based on an amount of network traffic, a base station may dynamically change a current connection mode to a new connection mode to satisfy quality of service (QoS) requirements. In some examples, the base station may dynamically switch from directly serving the UE to having one or more assisting nodes serve the UE, or vice versa. The UE may be agnostic to whether it is being served by one or both of the base station or the one or more assisting nodes. Prior to changing from the current connection mode to the new connection mode, the base station may update one or more communication parameters, of a communication parameter set, at the UE based on the new connection mode. The one or more communication parameters may include, for example, a timing reference, transmit power control (TPC) parameters, or a beam management configuration. In some examples, the one or more communication parameters may be associated with a large data payload. Therefore, updating the one or more communication parameters may increase network overhead due to a size of the data payload. In some such examples, it may not be feasible to dynamically change the one or more communication parameters in a timely manner due to the size of the data payload. Additionally, or alternatively, increasing a frequency between service configuration changes may also increase network overhead due to an increase in a number of transmissions associated with updating the one or more communication parameters. The increased network overhead may increase latency. Additionally, the increased network overhead may negatively impact one or more UE functions that track synchronization, phase noise, or channel estimates. Therefore, the increased network overhead may also reduce UE performance.

Various aspects disclosed relate generally to pre-configuring multiple communication parameter sets, at a UE, that are associated with respective serving-node-aware connection modes. As discussed, in conventional systems, a UE may be agnostic to whether it is being served by one or both of a base station or one or more assisting nodes. In contrast, in a serving-node-aware connection mode, a UE may be aware of the serving node (for example, one or both of a base station or one or more assisting nodes). Some aspects more specifically relate to receiving, by a UE, a message configuring the UE to use a particular serving-node-aware connection mode, and adopting a communication parameter set, from multiple pre-configured communication parameter sets, based on the particular serving-node-aware connection mode.

For example, the UE may perform an access procedure to connect with a network comprising multiple wireless network nodes, such as one or more base stations and one or more assisting nodes. The UE may be initially served by a subset of the wireless network nodes based on a current serving-node-aware connection mode. In some examples, the UE may subsequently receive a communication parameter message from one of the base stations or one of the assisting nodes indicating multiple communication parameter sets based on performing the access procedure. Each communication parameter set may be associated with a single respective serving-node-aware connection mode of multiple serving-node-aware connection modes. Additionally, each serving-node-aware connection mode may be associated with one or more respective wireless network nodes of the multiple wireless network nodes. After receiving the communication parameter message, the UE may then receive signaling configuring the UE to use a serving-node-aware connection mode of the multiple serving-node-aware connection modes. In some examples, the signaling may configure the UE to change a current serving-node-aware connection mode to a new serving-node-aware connection mode. The UE may then adopt the communication parameter set associated with the new serving-node-aware connection mode and communicate with the one or more wireless network nodes associated with the new serving-node-aware connection mode according to the adopted communication parameter set.

Particular aspects of the subject matter described in this disclosure may be implemented to realize one or more of the following potential advantages. In some examples, by receiving, in a communication parameter message, an indication of multiple communication parameter sets in advance of any serving-node-aware connection mode changes, the network (for example, a base station) may no longer need to transmit a new communication parameter set prior to each communication mode change. As such, the described techniques may reduce network overhead by reducing a number of communication parameter message transmissions. The reduction in the number of communication parameter message transmissions may reduce network overhead and reduce latency, thereby, improving network performance.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, for example, macro BSs, pico BSs, femto BSs, relay BSs, and/or the like. These different types of BSs may have different transmit power levels, different coverage areas, and different impact on interference in the wireless network 100. For example, macro BSs may have a high transmit power level (for example, 5 to 40 Watts) whereas pico BSs, femto BSs, and relay BSs may have lower transmit power levels (for example, 0.1 to 2 Watts).

As an example, the BSs 110 (shown as BS 110*a*, BS 110*b*, BS 110*c*, and BS 110*d*) and the core network 130 may exchange communications via backhaul links 132 (for example, S1, etc.). Base stations 110 may communicate with one another over other backhaul links (for example, X2, etc.) either directly or indirectly (for example, through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (for example, S1, S2, etc.) and may perform radio configuration and scheduling for communications with the UEs 120. In some configurations, various functions of each access network entity or base station 110 may be distributed across various network devices (for example, radio heads and access network controllers) or consolidated into a single network device (for example, a base station 110).

UEs 120 (for example, 120*a*, 120*b*, 120*c*) may be dispersed throughout the wireless network 100, and each UE may be stationary or mobile. A UE may also be referred to as an access terminal, a terminal, a mobile station, a subscriber unit, a station, and/or the like. A UE may be a cellular phone (for example, a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a connection mode module 140. For brevity, only one UE 120*d* is shown as including the connection mode module 140. The connection mode module 140 may perform an access procedure to connect with a network comprising multiple wireless network nodes; receive a communication parameter message indicating multiple communication parameter sets based on performing the access procedure; receive signaling configuring the UE to use a connection mode of the multiple connection modes; and communicate with the one or more wireless network nodes of the multiple wireless network nodes, according to a communication parameter set associated with the connection mode, based on receiving the signaling.

The base stations 110 may include a connection mode module 138. For brevity, only one base station 110 is shown as including the connection mode module 138. The connection mode module 138 may receive, from a UE, an access request for access to a network comprising a number of wireless network nodes; transmit, to the UE, a communication parameter message indicating multiple communication parameter sets based on receiving the access request for access; transmit, to the UE, signaling configuring the UE to use a connection mode of the multiple connection modes; and communicate, with the UE, according to a communication parameter set associated with the connection mode, based on transmitting the signaling.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (for example, remote device), or some other entity. A wireless network node may provide, for example, connectivity for or to a network (for example, a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (for example, shown as UE 120*a* and UE 120*e*) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (for example, a system information block (SIB).

As indicated above, FIG. 1 is provided merely as an example. Other examples may differ from what is described with regard to FIG. 1.

Figure 2:
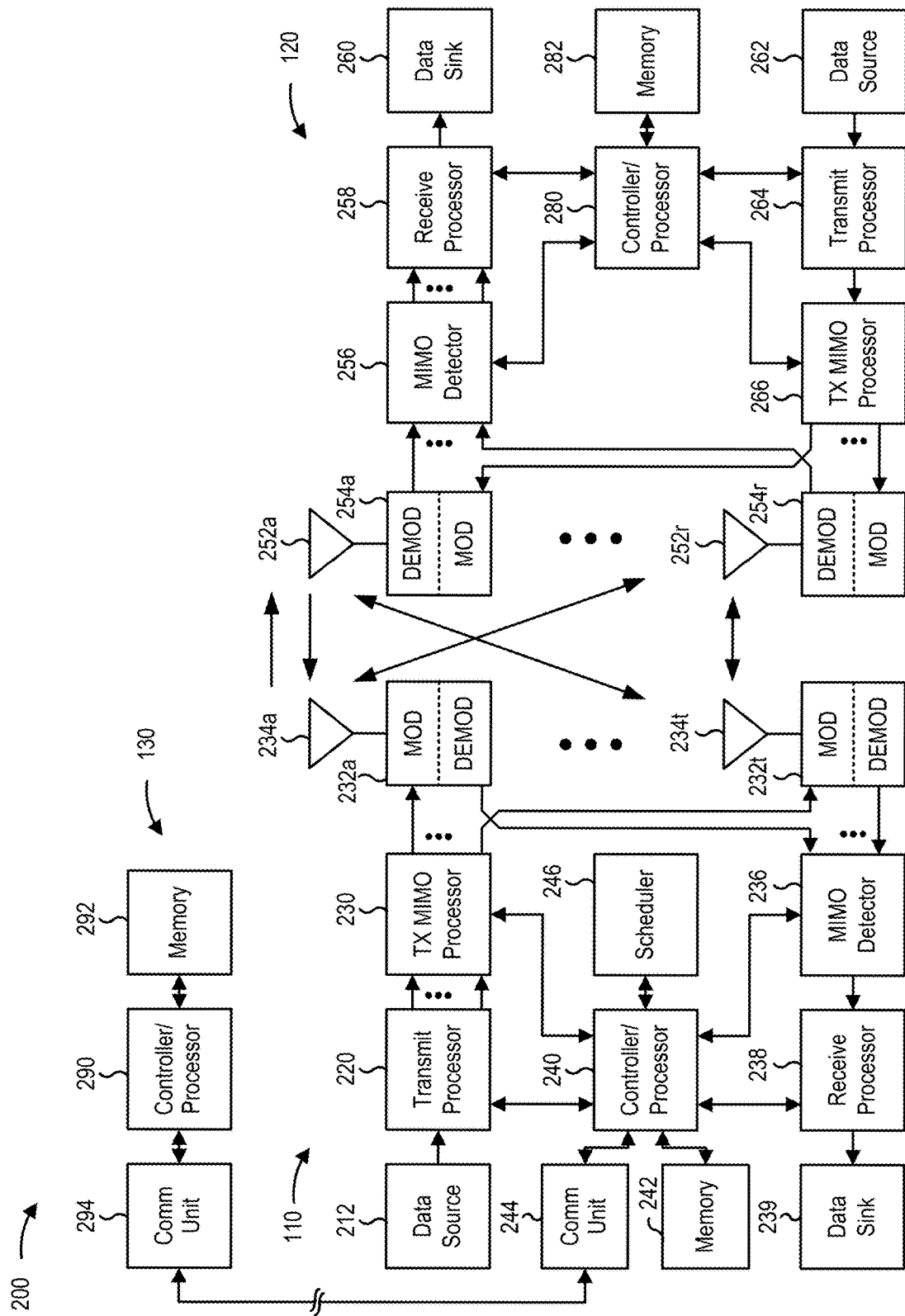
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. Decreasing the MCS lowers throughput but increases reliability of the transmission. The transmit processor 220 may also process system information (for example, for semi-static resource partitioning information (SRPI) and/or the like) and control information (for example, CQI requests, grants, upper layer signaling, and/or the like) and provide overhead symbols and control symbols. The transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, and/or the reference symbols, if applicable, and may provide T output symbol streams to T modulators (MODs) 232a through 232t. Each modulator 232 may process a respective output symbol stream (for example, for orthogonal frequency division multiplexing (OFDM) and/or the like) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (for example, for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (for example, for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with polar code encoding as described in more detail elsewhere. For example, the controller/processor 240 of the base station 110, the controller/processor 280 of the UE 120, and/or any other component(s) of FIG. 2 may perform or direct operations of, for example, the processes of FIGS. 6 and 8 and/or other processes as described. Memories 242 and 282 may store data and program codes for the base station 110 and UE 120, respectively. A scheduler 246 may schedule UEs for data transmission on the downlink and/or uplink.

Figure 3A:
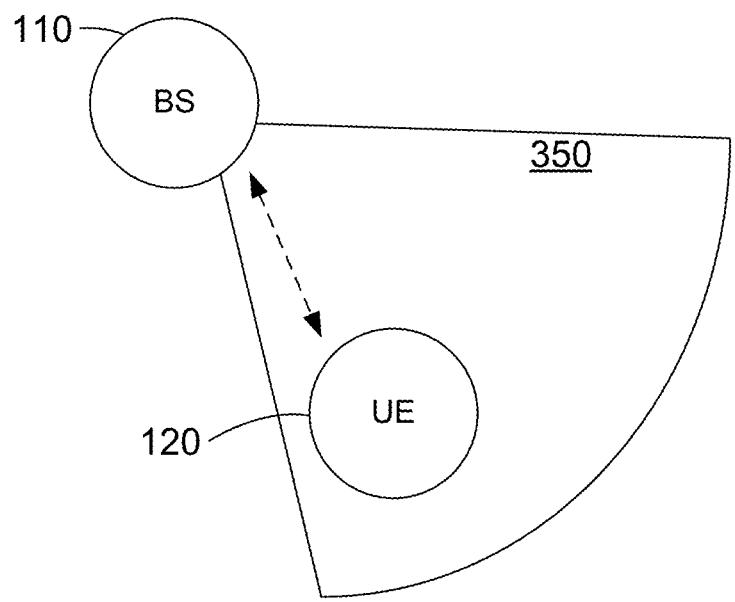
FIG. 3A is a diagram illustrating an example of the UE being served directly by a base station.

In wireless communication systems with multiple wireless network nodes, such as a base station and one or more assisting nodes, a UE may be served by one or more wireless network nodes based on a connection mode (for example, service configuration) from multiple connection modes. Each connection mode corresponds to a connection between the UE and one or more wireless network nodes. In one connection mode, the UE may be served directly by a base station. An example of this connection mode is illustrated in FIG. 3A, which is a diagram illustrating an example of a UE 120 being served directly by a base station 110. As shown in FIG. 3A, the UE 120 may be within a coverage area 350 of the base station 110 and may be served directly by the base station 110.

Figure 3B:
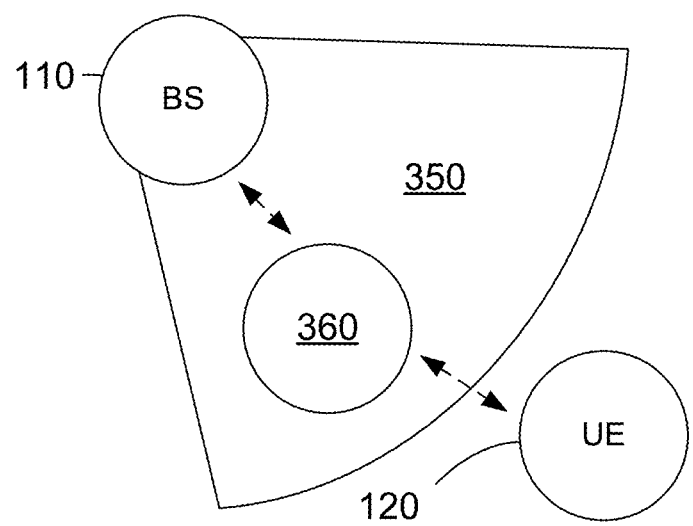
FIG. 3B is a diagram illustrating an example of the UE being served by an assisting node.
Figure 3C:
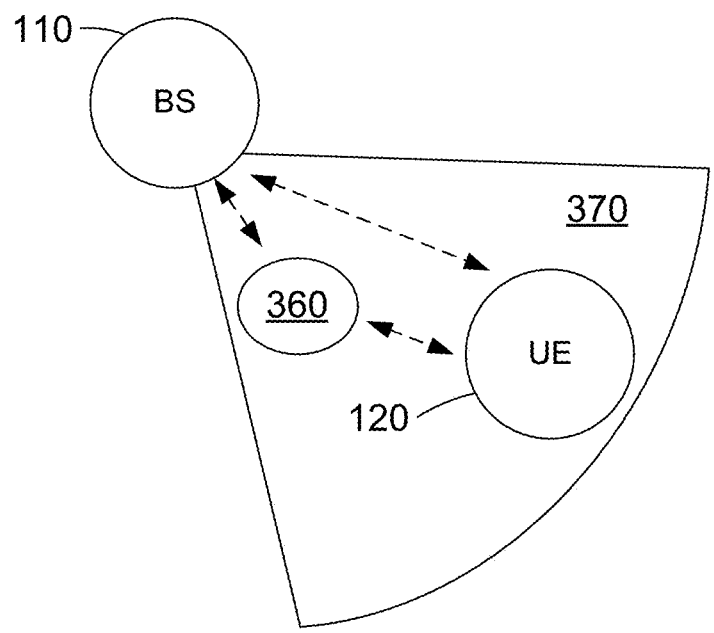
FIG. 3C is a diagram illustrating an example of the UE being served by both the base station and the assisting node.

In another connection mode, an assisting node serves the UE 120. An example of this connection mode is illustrated in FIG. 3B, which is a diagram illustrating an example of an assisting node 360 serving a UE 120. As shown in FIG. 3B, the UE 120 may be outside a coverage area 350 of a base station 110. In this example, the assisting node 360 may act as a type of relay between the UE 120 and the base station 110. The assisting node 360 may be an example of a repeater, a relay, or a reflector (for example, a reflecting surface or an intelligent reflecting surface). Although not shown in FIG. 3B, the UE 120 is within a coverage area of the assisting node 360. In yet another connection mode, both the base station 110 and the one or more assisting nodes 360 serve the UE 120 when the UE 120 is within coverage of both the base station 110 and the one or more assisting nodes 360. An example of this connection mode is illustrated in FIG. 3C, which is a diagram illustrating an example of both the base station 110 and the assisting node 360 serving the UE 120. As shown in FIG. 3C, the UE 120 may be within a coverage area 370 of both the base station 110 and the assisting node 360. In this example, the assisting node 360 may act as a type of relay between the UE 120 and the base station 110. Aspects of the present disclosure are not limited to the discussed connection modes; other connection modes may be used to serve the UE 120.

As discussed, the assisting node may be a repeater, a low-power relay node, or a reflector. A repeater is an example of a relay node that may amplify and forward transmissions between two wireless network nodes, such as a base station and a UE. The repeater may be a simple and cost-effective solution for improving network coverage. Other types of relay nodes may include decode-and-forward relay nodes, such as an IAB node.

A reflector is another example of an assisting node. A reflector may also be referred to as a reconfigurable intelligent surface (RIS) or an intelligent reconfigurable surface (IRS). The reflector may have electromagnetic material controlled by a wireless device, such as a base station, to extend coverage of a wireless network with a minimum impact on a total power consumption of a wireless system associated with the wireless network. In some examples, the reflector may be controlled to reflect an impinging signal to a desired direction. In some such examples, the base station may control the reflector. Additionally, or alternatively, the base station may control the reflector to adjust one or more characteristics of an impinging signal. These characteristics may include, for example, a phase, an amplitude, a frequency, or polarization.

Figure 3D:
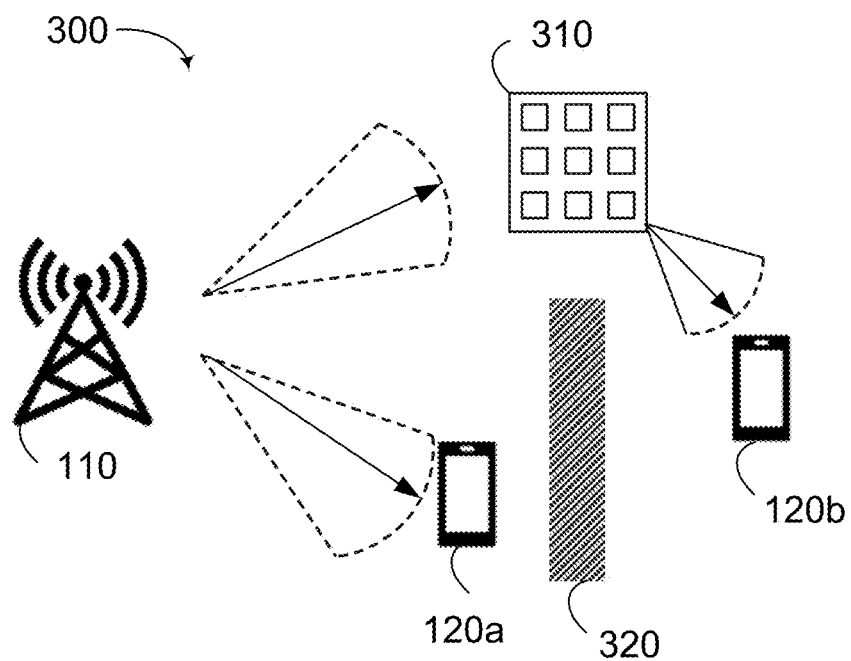
FIG. 3D is a diagram illustrating a wireless communication network employing a reflector to extend network coverage.

FIG. 3D is a block diagram illustrating a wireless communication network 300 employing a reflector 310 to extend network coverage. The reflector 310 is an example of an assisting node, such as the assisting node 360 described with reference to FIGS. 3B and 3C. As shown in the example of FIG. 3D, the wireless communication network 300 also includes a base station 110 and two UEs 120a and 120b. In the example of FIG. 3D, an environmental feature 320, such as a building, a mountain, or another type of natural or manmade object, may block a signal from the base station 110 to the second UE 120b. In some examples, the second UE 120b may fail to receive the signal from the base station 110 due to the blockage. In contrast, the first UE 120a may directly receive a signal from the base station 110. In some other examples, a quality of the signal received at the second UE 120b from the base station 110 may be less than a signal quality threshold due to the blockage by the environmental feature 320. In contrast to conventional systems that may deploy another assisting node to extend coverage to the second UE 120b, the example of FIG. 3D uses the reflector 310 to reflect the signal from the base station 110 signal around the environmental feature 320 (for example, around the blockage) to the second UE 120b. In such an example, the reflector 310 may extend network coverage of the wireless communication network 300 from the base station 110 to the second UE 120b.

In some examples, the reflector 310 may be controlled to reflect an impinging signal to a desired direction, such as toward the second UE 120b. In some such examples, the base station 110 may control the reflector 310. Additionally, or alternatively, the base station 110 may control the reflector 310 to adjust one or more characteristics of an impinging signal. These characteristics may include, for example, a phase, an amplitude, a frequency, or polarization of a signal transmitted by the base station 110 or the UEs 120a and 120b.

As discussed, based on an amount of network traffic, a base station may dynamically change a current connection mode to a new connection mode to satisfy quality of service (QoS) requirements. In some examples, the base station may dynamically switch from directly serving the UE to having one or more assisting nodes serve the UE, or vice versa. The UE may be agnostic to whether it is being served by one or both of the base station or the one or more assisting nodes. In some examples, changing the current connection mode (for example, service mode) where the base station serves the UE to a new connection mode including an assisting nodes may change various communication parameters, such as timing, power control, or beam configuration. In some such examples, downlink timing may change due to one or both of a propagation delay or an extra group-delay introduced by the assisting node. Additionally, uplink timing may change due to the propagation delay or the extra group-delay introduced by the assisting node. Additionally, or alternatively, the uplink timing may change to compensate for a different effective end-to-end round-trip time (RTT). Furthermore, the assisting node may cause a change in one or more of a downlink transmission power, a reference signal received power (RSRP) measurement, an estimated pathloss, or an uplink power control. The assisting node may still further change candidates for transmit beams or receive beams. As an example, one or both of a configured transmission configuration indicator (TCI) state or a sounding reference signal resource indicator (SRI) may change based on the use of the assisting node.

In some examples, the assisting node and the base station may not be synchronized. In some such examples, the UE may accommodate the synchronization mismatch by using different synchronization references, such as one or both of time references or frequency references. Additionally, or alternatively, the UE may adjust a tracking loop, such as one or both of a time tracking loop or a frequency tracking loop. Using the assisting node to serve the UE may also change an effective phase noise, or an estimated phase noise, and channel characteristics.

As discussed, changing from the current connection mode where the base station serves the UE to a new connection mode including an assisting node may change various communication parameters. To accommodate the changed parameters, the base station may update one or more communication parameters at the UE to accommodate the new connection mode. As previously discussed, the updates to the one or more communication parameters may increase network overhead. Therefore, it may be desirable to improve a process for changing connection modes to reduce network overhead.

According to various aspects of the present disclosure, a UE may receive a message, from a base station, indicating multiple communication parameters based on the UE performing an access procedure with the base station. Each communication parameter set may be associated with a single respective serving-node-aware connection mode of multiple serving-node-aware connection modes. Additionally, each serving-node-aware connection mode may be associated with one or more respective wireless network nodes of the multiple wireless network nodes. In some examples, the UE determines a serving-node-aware connection mode based on an implicit indication or an explicit indication. In some such examples, the implicit indication may be based on transmission resources associated with a communication parameter set. In other such examples, the UE may infer a serving-node-aware connection mode based on control signaling. In still other such examples, the UE may receive a connection mode message indicating a serving-node-aware connection mode that is to be used by the UE. For ease of explanation, the serving-node-aware connection mode may be referred to as the connection mode.

Figure 4:
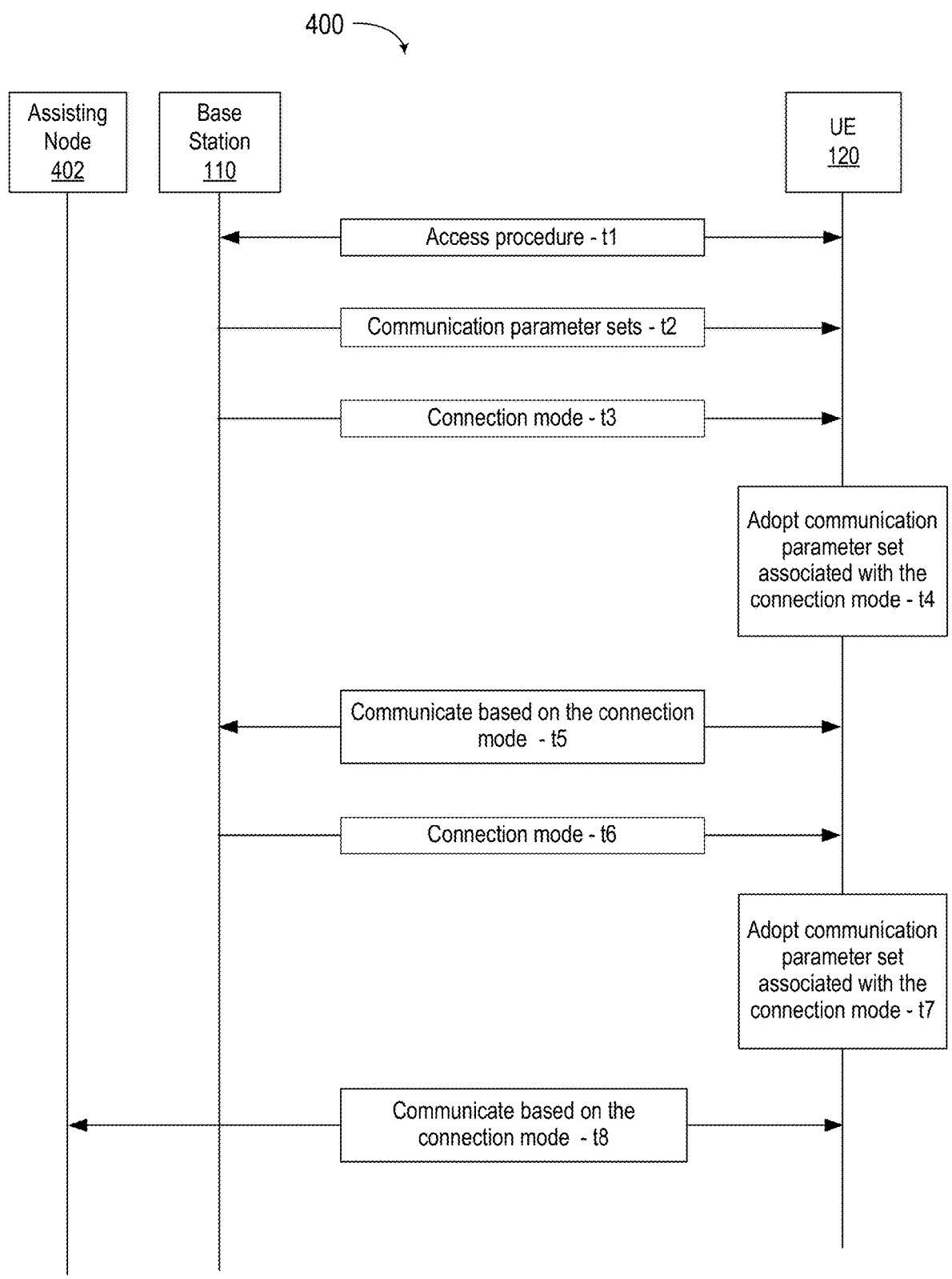
FIG. 4 is a timing diagram illustrating an example of configuring different communication parameter sets at a UE, where each communication parameter set is associated with a single respective connection mode of multiple connection modes, in accordance with aspects of the present disclosure.

FIG. 4 is a timing diagram illustrating an example 400 of configuring different communication parameter sets at a UE 120, where each communication parameter set is associated with a single respective connection mode (for example, serving-node-aware connection mode) of multiple connection modes, in accordance with aspects of the present disclosure. In the example 400 of FIG. 4, a wireless communication system may include wireless network nodes, such as one or more base stations 110 and one or more assisting nodes 402. The assisting node 402 may be an example of an assisting node 360 described with reference to FIGS. 3B and 3C. The one or more assisting nodes 402 may be a same type of node, such as a repeater, relay, or a reflector, or different types of assisting nodes. The UE 120 may be served by different subsets of the wireless network nodes, where each subset corresponds to a respective connection mode of multiple connection modes. In some examples, each connection mode may be associated with a single respective index of multiple indices. For ease of explanation, the example 400 is limited to one base station 110 and one assisting node 402.

As shown in FIG. 4, at time t1, the UE 120 may perform an access procedure to connect with the base station 110. In some examples, the access procedure may be a random access procedure for initial access. Still, other types of access procedures are contemplated. At time t2, the base station 110 may transmit a communication parameter message indicating multiple communication parameter sets based on the access procedure (at time t1). Each communication parameter set may be associated with a single respective connection mode of multiple connection modes. Additionally, each connection mode may be associated with one or more respective wireless network nodes of the multiple wireless network nodes, such as the one or more base stations 110 or the one or more assisting nodes 402.

Each communication parameter set may indicate one or more parameters for the UE. The one or more parameters may indicate one or more of a timing parameter, communication resources, a power control parameter, one or more communication beams, reference signal parameters, random access parameters, bandwidth part parameters, or control resource parameters. The timing parameter may indicate one or more offsets for one or both of a downlink reception timing adjustment or an uplink transmission timing adjustment. Additionally, or alternatively, the timing parameter may indicate one or both of a range or a granularity of a timing adjustment command. In some examples, the communication resources may indicate one or more downlink resources, such as a reference signal (RS) (for example, channel state information-RS (CSI-RS) or a synchronization signal block (SSB)), for a timing estimation, a path loss estimation, or an RSRP measurement. Additionally, or alternatively, the communication resources may indicate resources and configurations, such as a periodicity, an offset, or a density, of both uplink and downlink reference signals for beam tracking or channel measurements. The power control parameter may indicate a downlink transmission power, such as an SSB power or a CSI-RS power. The downlink transmission power may be an absolute value or an offset value to a reference number previously broadcasted to the UE 120. Additionally, or alternatively, the power control parameter may indicate one or both of an open-loop or closed-loop uplink transmission power control parameter. The uplink transmission power control parameter may be a configured range of values or a specific value. The one or more communication beams may indicate one or both of semi-statically configured beams or active beams to be used for downlink or uplink communications. In some examples, the one or more communication parameters may indicate a time tracking loop (TTL)/frequency tracking loop (FTL) and a phase noise. Based on the indicated TTL/FTL and phase noise, the UE may adjust one or more loops, or create one or more separate loops, to estimate and track timing, frequency, or phase noise. Additionally, or alternatively, the one or more communication parameters may indicate a slot format indication (SFI) or a time division duplex (TDD) configuration. Additionally, or alternatively, the one or more communication parameters may indicate one or more of random access parameters, such as random access channel (RACH) resources, bandwidth part parameters, or control resource parameters, such as a radio network temporary identifier (RNTI) configuration or a control resource set (CORESET) configuration.

At time t3, the base station 110 may indicate a connection mode (for example, new connection mode). Although not shown in FIG. 4, in some other examples, at time t3, the assisting node 402 may indicate the connection mode. In some examples, the connection mode may be expressly indicated in a message, such as a connection mode message. In other examples, the connection mode may be indicated via control signaling. In such examples, the connection mode may be dynamically indicated via downlink control information (DCI) or a medium access control-control element (MAC-CE). In other such examples, the connection mode may be semi-statically configured, such that the UE 120 may periodically, or aperiodically, change the connection mode based on the semi-static configuration. A pattern of connection modes may be used to semi-statically configure the periodic or aperiodic change connection modes, wherein the connection mode changes based on the pattern. In some such examples, the connection mode may be associated with a set of slots (for example, a pattern of slots). Additionally, or alternatively, the connection mode may be associated with specific transmission resources, such as uplink resources or downlink resources. The connection mode may be semi-statically configured via a radio resource control (RRC) configuration. In some examples, the connection mode may be associated with specific communication resources, such as uplink resources, flexible resources, or downlink resources. Additionally, or alternatively, the connection mode may be associated with specific frequency resources, such as one or more bandwidth parts or one or more raster. In some examples, the connection mode may be UE-specific, such that the connection mode may be indicated in a unicast message. In other examples, the connection mode may be specific to a group of UEs, or cell-specific. In some such examples, the connection mode may be indicated via a broadcast message or a multi-cast message, such as group-common DCI. In some examples, the connection mode may be specific to one or more wireless network nodes, such as one or more assisting nodes 402. As discussed, each connection mode may be associated with a single respective index. In some examples, an index associated with the connection mode may be used to indicate the connection mode.

Although not shown in FIG. 4, in some examples, the UE 120 may transmit a request for the connection mode prior to receiving the indication of the connection mode at time t3. The request may be a request to change a connection mode. In some examples, at time t3, the UE 120 may receive an indication of two or more connection modes, where each connection mode is associated with different resources. In some such examples, a first connection mode may be associated with uplink transmissions and a second connection mode may be associated with downlink communications. In other such examples, a first connection mode may be associated with a first set of slots within a communication window and a second connection mode may be associated with a second set of slots within a communication window.

At time t4, the UE 120 may adopt parameters corresponding to the connection mode indicated at time t3. The adopted parameters may correspond to the index associated with the connection mode. In some examples, the UE 120 may determine a communication parameter set to use based on a type of communication. As discussed, a connection mode may be associated with one or more resources, such as uplink or downlink resource, or a set of resources (for example, a set of slots). In such examples, the UE 120 may determine the connection mode and the associated parameter set based on whether the communication is an uplink communication, a downlink communication, or whether the communication is within a slot of a set of slots. At time t5, the UE 120 may communicate with a wireless network node, such as the base station 110, associated with the connection mode. The communication may be performed based on the parameter set associated with the connection mode.

As shown in the example of FIG. 4, at time t6, the UE 120 receives another indication of a connection mode (for example, an indication of a connection mode change). As discussed, the connection mode indication may be transmitted by the base station 110 or one or more assisting nodes 402. At time t7, the UE 120 adopts a parameter set associated with the connection mode indicated at time t6. At time t8, the UE 120 communicates with a wireless network node, such as the assisting node 402, associated with the connection mode. The communication may be performed based on the parameter set associated with the connection mode.

Figure 5:
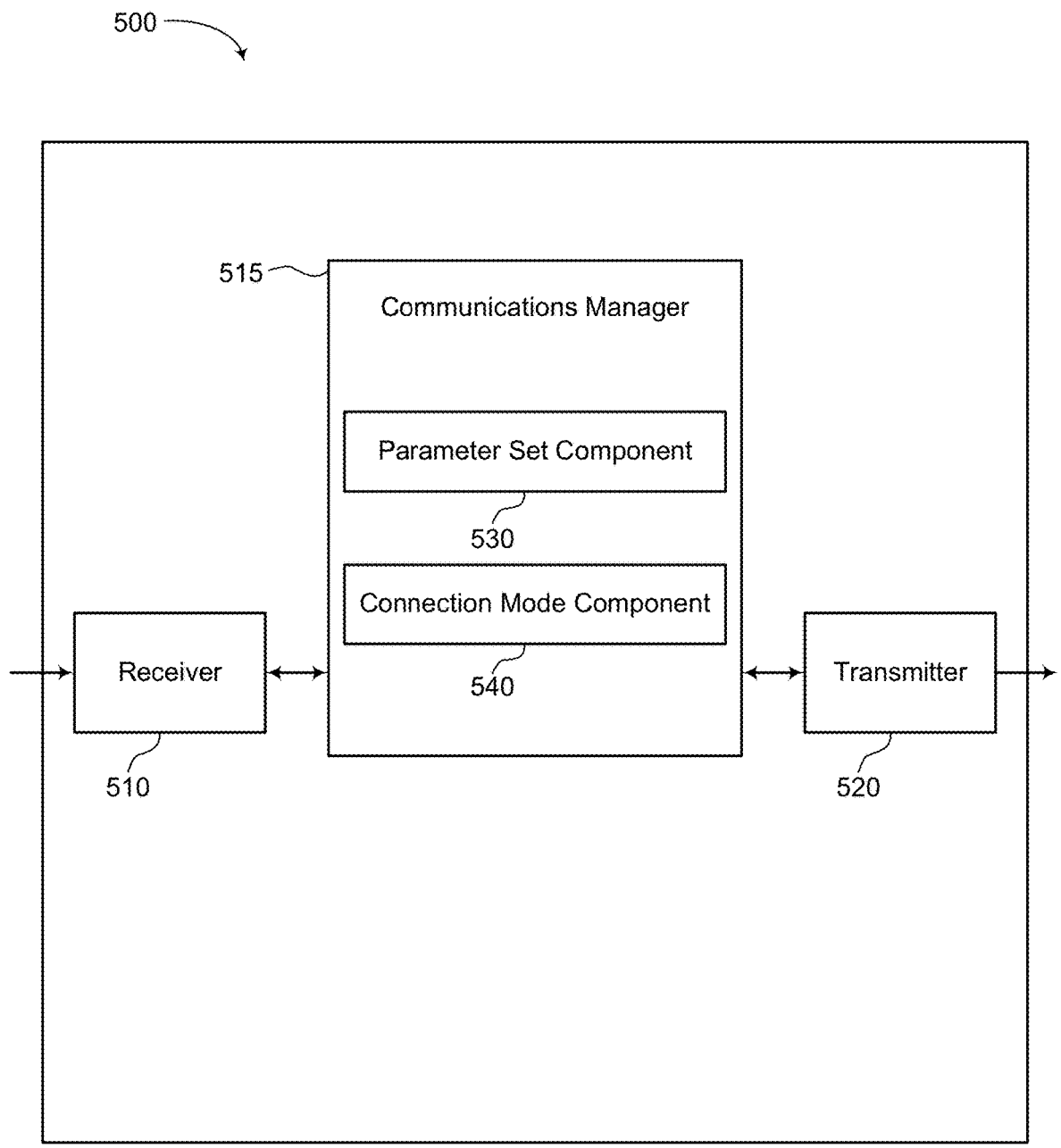
FIG. 5 is a block diagram illustrating an example wireless communication device that supports adopting a pre-configured parameter set based on a connection mode, in accordance with some aspects of the present disclosure.

FIG. 5 is a block diagram illustrating an example wireless communication device that supports adopting a pre-configured parameter set based on a connection mode, in accordance with some aspects of the present disclosure. The device 500 may be an example of aspects of a UE 120 described with reference to FIGS. 1, 2, 3A, 3B, 3C, 3D, and 4. The wireless communications device 500 may include a receiver 510, a communications manager 505, a transmitter 520, a parameter set component 530, and a connection mode component 540, which may be in communication with one another (for example, via one or more buses). In some examples, the wireless communications device 500 is configured to perform operations, including operations of the process 600 described below with reference to FIG. 6.

In some examples, the wireless communications device 500 can include a chip, chipset, package, or device that includes at least one processor and at least one modem (for example, a 5G modem or other cellular modem). In some examples, the communications manager 505, or its subcomponents, may be separate and distinct components. In some examples, at least some components of the communications manager 505 are implemented at least in part as software stored in a memory. For example, portions of one or more of the components of the communications manager 505 can be implemented as non-transitory code executable by the processor to perform the functions or operations of the respective component.

The receiver 510 may receive one or more of reference signals (for example, periodically configured channel state information reference signals (CSI-RSs), aperiodically configured CSI-RSs, or multi-beam-specific reference signals), synchronization signals (for example, synchronization signal blocks (SSBs)), control information and data information, such as in the form of packets, from one or more other wireless communications devices via various channels including control channels (for example, a physical downlink control channel (PDCCH) or physical uplink control channel (PUCCH)) and data channels (for example, a physical downlink shared channel (PDSCH) or a physical uplink shared channel (PUSCH)). The other wireless communications devices may include, but are not limited to, a base station 110 or UE 120 described with reference to FIG. 1.

The received information may be passed on to other components of the device 500. The receiver 510 may be an example of aspects of the receive processor 238, 258 described with reference to FIG. 2. The receiver 510 may include a set of radio frequency (RF) chains that are coupled with or otherwise utilize a set of antennas (for example, the set of antennas may be an example of aspects of the antennas 252a, 234a through 252r, 234t described with reference to FIG. 2).

The transmitter 520 may transmit signals generated by the communications manager 505 or other components of the wireless communications device 500. In some examples, the transmitter 520 may be collocated with the receiver 510 in a transceiver. The transmitter 520 may be an example of aspects of the transmit processor 220, 264 described with reference to FIG. 2. The transmitter 520 may be coupled with or otherwise utilize a set of antennas (for example, the set of antennas may be an example of aspects of the antennas 252a, 234a through 252r, 234t described with reference to FIG. 2), which may be antenna elements shared with the receiver 510. In some examples, the transmitter 520 is configured to transmit control information in a PUCCH or PDCCH and data in a physical uplink shared channel (PUSCH) or PDSCH.

The communications manager 505 may be an example of aspects of the controller/processor 280 described with reference to FIG. 2. The communications manager 505 may include the parameter set component 530 and the connection mode component 540. In some examples, working in conjunction with the transmitter 520, the communications manager 505 may perform an access procedure to connect with a network comprising multiple wireless network nodes. Working in conjunction with the receiver 510, the parameter set component 530 may receive a communication parameter message indicating multiple communication parameter sets based on performing the access procedure. Each communication parameter set may be associated with a single respective connection mode of the multiple connection modes, and each connection mode may be associated with one or more respective wireless network nodes of the multiple wireless network nodes. Working in conjunction with the receiver 510, the connection mode component 540 may receive signaling configuring the UE to use a connection mode of the multiple connection modes. Working in conjunction with one or more of the transmitter 520, the parameter set component 530, or the connection mode component 540, the communications manager 505 communicates with the one or more wireless network nodes of the multiple wireless network nodes, according to a communication parameter set associated with the connection mode, based on receiving the signaling. The one or more wireless network nodes may be associated with the connection mode.

Figure 6:
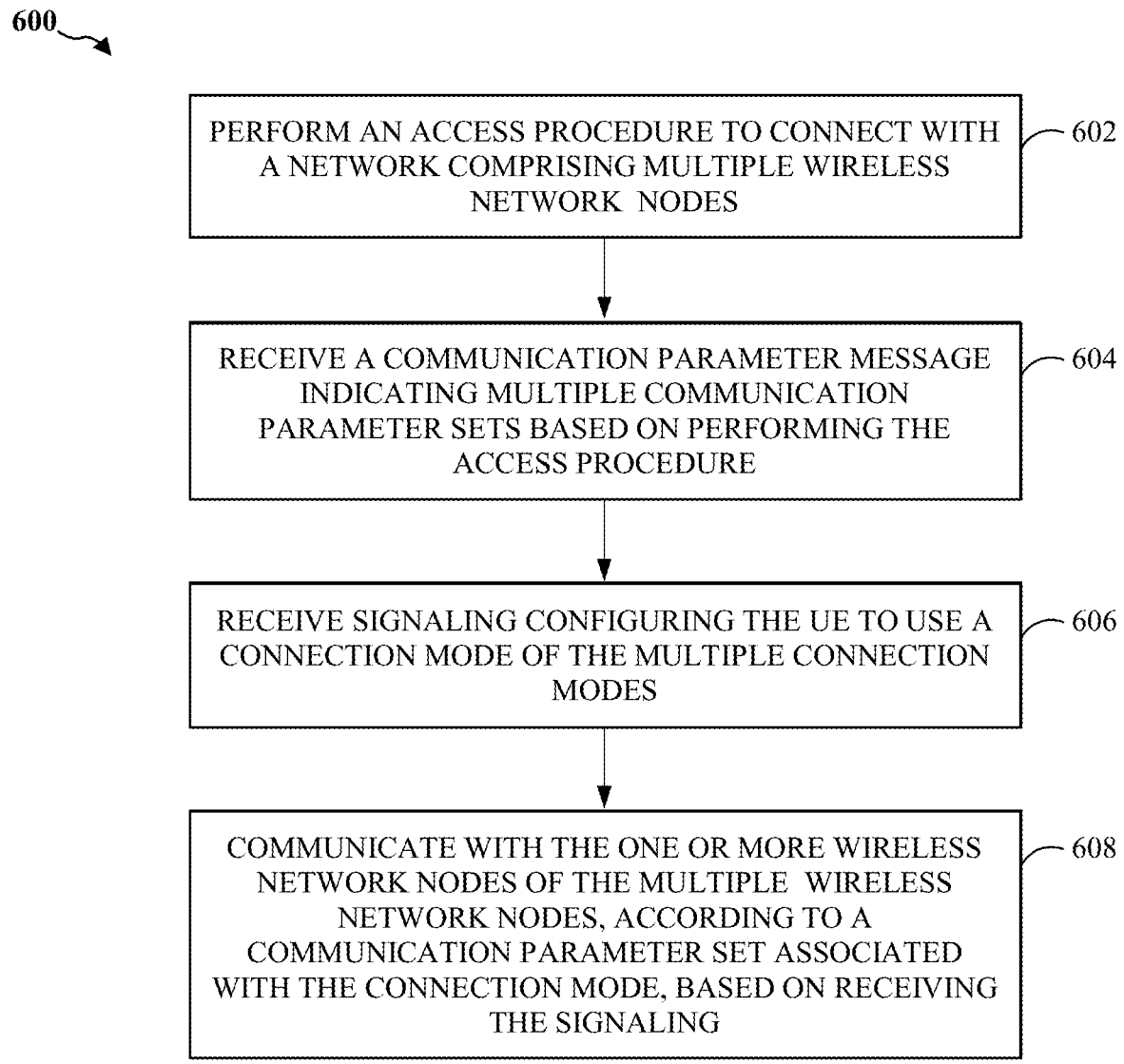
FIG. 6 is a flow diagram illustrating an example process performed by a UE, in accordance with some aspects of the present disclosure.

FIG. 6 is a flow diagram illustrating an example process 600 performed by a UE, in accordance with some aspects of the present disclosure. The UE may be an example of a UE 120 described with reference to FIGS. 1, 2, 3A, 3B, 3C, 3D, and 4. The example process 600 is an example of adopting a pre-configured parameter set based on a connection mode. As shown in FIG. 6, the process 600 begins at block 602 by performing an access procedure to connect with a network comprising multiple wireless network nodes. At block 604, the process 600 receives a communication parameter message indicating multiple communication parameter sets based on performing the access procedure. Each communication parameter set may be associated with a single respective connection mode of the multiple connection modes, and each connection mode may be associated with one or more respective wireless network nodes of the multiple wireless network nodes. At block 606, the process 600 receives signaling configuring the UE to use a connection mode of the multiple connection modes. At block 608, the process 600 communicates with the one or more wireless network nodes of the multiple wireless network nodes, according to a communication parameter set associated with the connection mode, based on receiving the signaling. The one or more wireless network nodes may be associated with the connection mode.

Figure 7:
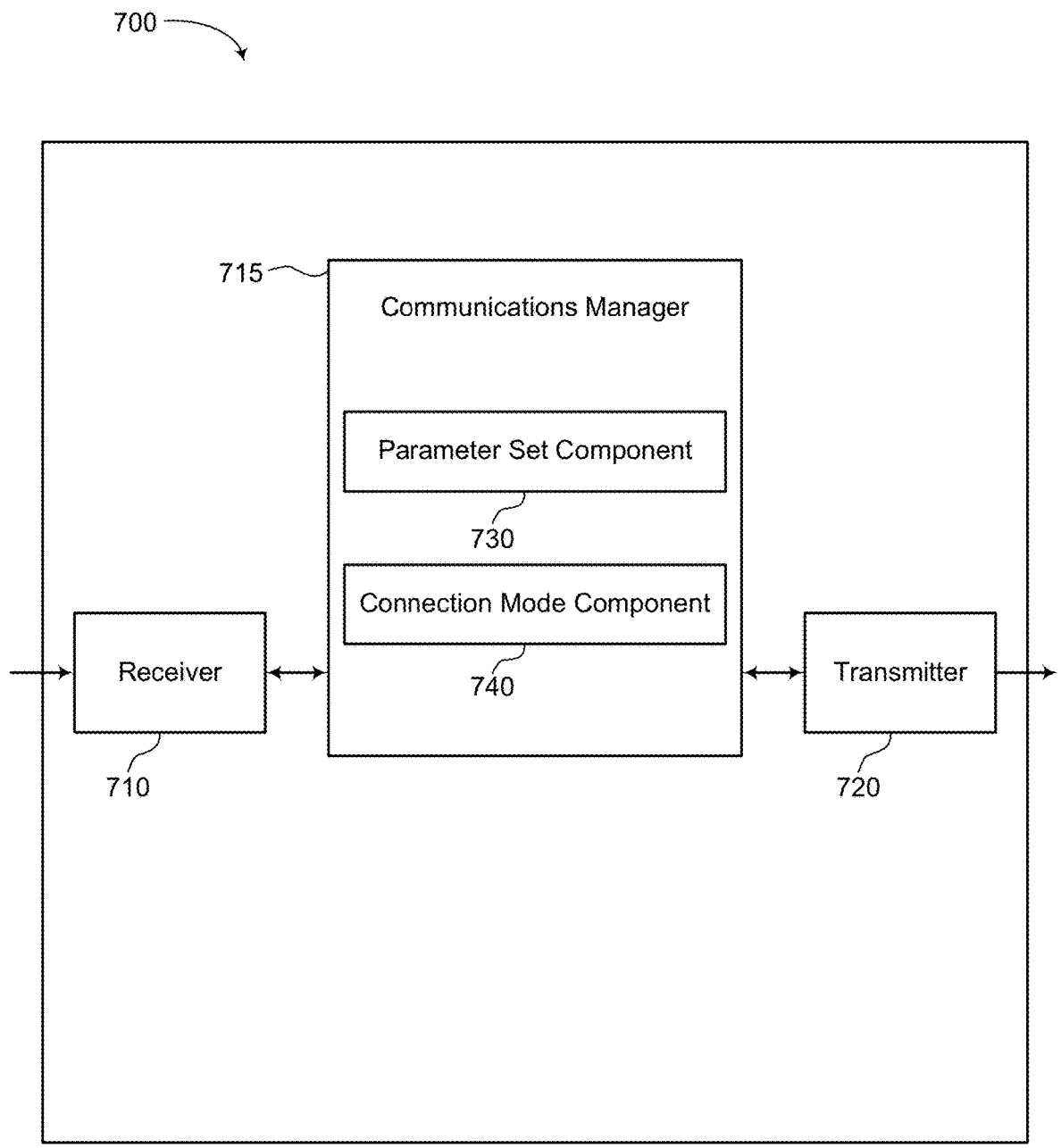
FIG. 7 is a block diagram illustrating an example wireless communication device that supports pre-configuring multiple communication parameter sets at a UE and indicating a connection mode, in accordance with aspects of the present disclosure.

FIG. 7 is a block diagram illustrating an example wireless communication device 700 that supports pre-configuring multiple communication parameter sets at a UE and indicating a connection mode, in accordance with aspects of the present disclosure. The wireless communication device 700 may be an example of aspects of a base station 110 described with reference to FIGS. 1, 2, 3A, 3B, 3C, 3D, and 4, or an assisting node 360, and 402 described with reference to FIGS. 3B, 3C, 3D, and 4. The wireless communication device 700 may include a receiver 710, a communications manager 715, a parameter set component 730, a connection mode component 740, and a transmitter 720, which may be in communication with one another (for example, via one or more buses). In some examples, the wireless communication device 700 is configured to perform operations, including operations of the process 800 described below with reference to FIG. 8.

In some examples, the wireless communication device 700 can include a chip, system on chip (SOC), chipset, package, or device that includes at least one processor and at least one modem (for example, a 5G modem or other cellular modem). In some examples, the communications manager 715, or its sub-components, may be separate and distinct components. In some examples, at least some components of the communications manager 715 are implemented at least in part as software stored in a memory. For example, portions of one or more of the components of the communications manager 715 can be implemented as non-transitory code executable by the processor to perform the functions or operations of the respective component.

The receiver 710 may receive one or more reference signals (for example, periodically configured CSI-RSs, aperiodically configured CSI-RSs, or multi-beam-specific reference signals), synchronization signals (for example, synchronization signal blocks (SSBs)), control information, and/or data information, such as in the form of packets, from one or more other wireless communication devices via various channels including control channels (for example, a PDCCH) and data channels (for example, a PDSCH). The other wireless communication devices may include, but are not limited to, another base station 110 or a UE 120, described with reference to FIGS. 1 and 2.

The received information may be passed on to other components of the wireless communication device 700. The receiver 710 may be an example of aspects of the receive processor 238 described with reference to FIG. 2. The receiver 710 may include a set of radio frequency (RF) chains that are coupled with or otherwise utilize a set of antennas (for example, the set of antennas may be an example of aspects of the antennas 234a through 234t described with reference to FIG. 2).

The transmitter 720 may transmit signals generated by the communications manager 715 or other components of the wireless communication device 700. In some examples, the transmitter 720 may be collocated with the receiver 710 in a transceiver. The transmitter 720 may be an example of aspects of the transmit processor 220 described with reference to FIG. 2. The transmitter 720 may be coupled with or otherwise utilize a set of antennas (for example, the set of antennas may be an example of aspects of the antennas 234a through 234t), which may be antenna elements shared with the receiver 710. In some examples, the transmitter 720 is configured to transmit control information in a physical uplink control channel (PUCCH) and data in a physical uplink shared channel (PUSCH).

The communications manager 715 may be an example of aspects of the controller/processor 240 described with reference to FIG. 2. The communications manager 715 includes a parameter set component 730 and a connection mode component 740. In some examples, working in conjunction with the receiver 710 the communications manager 715 receives, from a UE, an access request for access to a network comprising a number of wireless network nodes. Working in conjunction with the transmitter 720, the parameter set component 730 transmits, to the UE, a communication parameter message indicating multiple communication parameter sets based on receiving the access request for access. Additionally, working in conjunction with the transmitter 720, the connection mode component 740 transmits, to the UE, signaling configuring the UE to use a connection mode of the multiple connection modes. Furthermore, working in conjunction with one or more of the transmitter 720, the parameter set component 730, and the connection mode component 740, the communications manager 715 communicates, with the UE, according to a communication parameter set associated with the connection mode.

Figure 8:
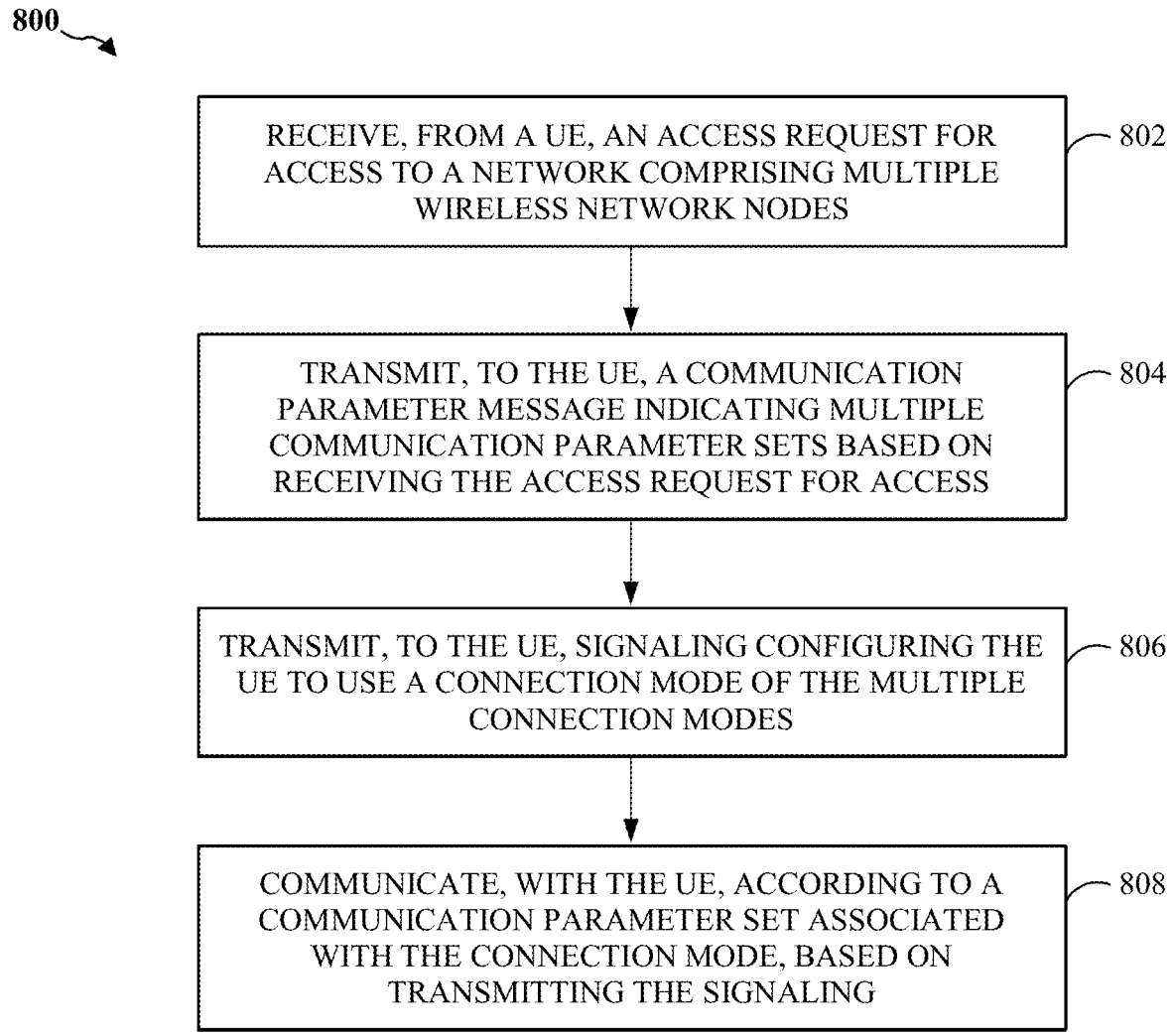
FIG. 8 is a flow diagram illustrating an example of a process performed by a wireless device, in accordance with some aspects of the present disclosure.

FIG. 8 is a flow diagram illustrating an example of a process 800 performed by a wireless device, in accordance with some aspects of the present disclosure. The wireless device may be an example of a base station 110 described with reference to FIGS. 1, 2, 3A, 3B, 3C, 3D, and 4, or an assisting node 360, and 402 described with reference to FIGS. 3B, 3C, 3D, and 4. The example process 800 is an example of pre-configuring a parameter set at a UE and indicating a connection mode. As shown in FIG. 8, the process 800 begins at block 802, by receiving, from a UE, an access request for access to a network comprising a number of wireless network nodes. At block 804, the process 800 transmits, to the UE, a communication parameter message indicating multiple communication parameter sets based on receiving the access request for access. Each communication parameter set may be associated with a single respective connection mode of a multiple connection modes, and each connection mode may be associated with one or more respective wireless network nodes of the multiple wireless network nodes. At block 806, the process

800 transmits, to the UE, signaling configuring the UE to use a connection mode of the multiple connection modes. At block 808, the process 800 communicates, with the UE, according to a communication parameter set associated with the connection mode, based on transmitting the signaling. The base station is associated with the connection mode.

Implementation examples are described in the following numbered clauses:

Clause 1. A method for wireless communication by a user equipment UE, comprising: performing an access procedure to connect with a network comprising a plurality of wireless network nodes; receiving a communication parameter message indicating a plurality of communication parameter sets based on performing the access procedure, each communication parameter set being associated with a single respective connection mode of a plurality of connection modes, each connection mode being associated with one or more respective wireless network nodes of the plurality of wireless network nodes; receiving signaling configuring the UE to use a connection mode of the plurality of connection modes; and communicating with the one or more wireless network nodes of the plurality of wireless network nodes, according to a communication parameter set associated with the connection mode, based on receiving the signaling, the one or more wireless network nodes being associated with the connection mode.

Clause 2. The method of Clause 1, wherein: the plurality of wireless network nodes includes one or more base stations and one or more assisting nodes; and the one or more assisting nodes include one or more repeaters, relays, or reflectors.

Clause 3. The method of any one of Clauses 1-2, wherein the communication parameter message and the signaling are received from a single wireless network node of the plurality of wireless network nodes.

Clause 4. The method of any one of Clauses 1-2, wherein: the communication parameter message is received from a first wireless network node of the plurality of wireless network nodes; and the signaling is received from a second wireless network node of the plurality of wireless network nodes.

Clause 5. The method of any one of Clauses 1-4, wherein: each connection mode of the plurality of connection modes is further associated with a single respective index of a plurality of indices; the signaling indicates the single respective index associated with the connection mode; and the method further comprises determining the connection mode based on the single respective index.

Clause 6. The method of any one of Clauses 1-5 wherein each connection mode of the plurality of connection modes is associated with one or both of: frequency resources, or one of uplink transmission resources, downlink transmission resources, or flexible transmission resources.

Clause 7. The method of any one of Clauses 1-6, wherein: the signaling is a connection mode message; and the connection mode message indicates the connection mode.

Clause 8. The method of any one of Clauses 1-6, wherein: the signaling is control signaling that indicates a control parameter, and the method further comprises inferring the connection mode based on the control parameter.

Clause 9. The method of any one of Clauses 1-8, further comprising transmitting a request for an initial connection mode or a connection mode change, wherein the signaling is received based on transmitting the request.

Clause 10. The method of any one of Clauses 1-9, wherein each communication parameter set of the plurality of communication parameter sets indicates one or more of a timing parameter, communication resources, a power control parameter, one or more communication beams, reference signal parameters, random access parameters, bandwidth part parameters, or control resource parameters.

Clause 11. A method for wireless communication by a base station, comprising: receiving, from a UE, an access request for access to a network comprising a plurality of wireless network nodes; transmitting, to the UE, a communication parameter message indicating a plurality of communication parameter sets based on receiving the access request for access, each communication parameter set being associated with a single respective connection mode of a plurality of connection modes, each connection mode being associated with one or more respective wireless network nodes of the plurality of wireless network nodes; transmitting, to the UE, signaling configuring the UE to use a connection mode of the plurality of connection modes; and communicating, with the UE, according to a communication parameter set associated with the connection mode, based on transmitting the signaling, the base station being associated with the connection mode.

Clause 12. The method of Clause 11, wherein: the plurality of wireless network nodes includes the base station and one or more assisting nodes; and the one or more assisting nodes include one or more repeaters, relays, or reflectors.

Clause 13. The method of any one of Clauses 11-12, wherein: each connection mode of the plurality of connection modes is further associated with a single respective index of a plurality of indices; and the signaling indicates the single respective index associated with the connection mode.

Clause 14. The method of any one of Clauses 11-12, wherein each connection mode of the plurality of connection modes is associated with one or both of: frequency resources, or one of uplink transmission resources, downlink transmission resources, or flexible transmission resources.

Clause 15. The method of any one of Clauses 11-14, wherein the signaling is a connection mode message that indicates the connection mode.

Clause 16. The method of any one of Clauses 11-15, wherein: the signaling is control signaling that indicates a control parameter, and the control parameter is associated with the connection mode.

Clause 17. The method of any one of Clauses 11-16, further comprising receiving a connection mode request for an initial connection mode or a connection mode change, wherein the signaling is transmitted based on receiving the connection mode request.

Clause 18. The method of any one of Clauses 11-17, wherein each communication parameter set of the plurality of communication parameter sets indicates one or more of a timing parameter, communication resources, a power control parameter, one or more communication beams, reference signal parameters, random access parameters, bandwidth part parameters, or control resource parameters.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (for example, related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

As used, "or" is used intended to be interpreted in the inclusive sense, unless otherwise explicitly indicated. For example, "a or b" may include a only, b only, or a combination of a and b. As used, a phrase referring to "at least one of" or "one or more of" a list of items refers to any combination of those items, including single members. For example, "at least one of: a, b, or c" is intended to cover the examples of: a only, b only, c only, a combination of a and b, a combination of a and c, a combination of b and c, and a combination of a and b and c.

What is claimed is:

1. A method for wireless communication by a user equipment (UE), comprising:

performing an access procedure to connect with a network comprising a set of wireless network nodes;

receiving a communication parameter message indicating a plurality of communication parameter sets in accordance with performing the access procedure, each communication parameter set being associated with a single respective connection mode of a plurality of connection modes, each connection mode being associated with a respective subset of wireless network nodes of the set of wireless network nodes;

receiving signaling configuring the UE to use a first connection mode of the plurality of connection modes; and communicating with a first subset of wireless network nodes of the set of wireless network nodes, according to a communication parameter set associated with the first connection mode, in accordance with receiving the signaling, the first subset of one or more wireless network nodes being associated with the first connection mode.

2. The method of claim 1, wherein:
the set of wireless network nodes includes one or more base stations and one or more assisting nodes; and
the one or more assisting nodes include one or more repeaters, relays, or reflectors.

3. The method of claim 1, wherein the communication parameter message and the signaling are received from a single wireless network node of the set of wireless network nodes.

4. The method of claim 1, wherein:
the communication parameter message is received from a first wireless network node of the set of wireless network nodes; and
the signaling is received from a second wireless network node of the set of wireless network nodes.

5. The method of claim 1, wherein:
each connection mode of the plurality of connection modes is further associated with a single respective index of a plurality of indices;
the signaling indicates the single respective index associated with the connection mode; and
the method further comprises determining the connection mode in accordance with the single respective index.

6. The method of claim 1, wherein each connection mode of the plurality of connection modes is associated with one or both of:
frequency resources, or one of uplink transmission resources, downlink transmission resources, or flexible transmission resources.

7. The method of claim 1, wherein:
the signaling is a connection mode message; and
the connection mode message indicates the connection mode.

8. The method of claim 1, wherein:
the signaling is control signaling that indicates a control parameter, and
the method further comprises inferring the connection mode in accordance with the control parameter.

9. The method of claim 1, further comprising transmitting a request for an initial connection mode or a connection mode change, wherein the signaling is received in accordance with transmitting the request.

10. The method of claim 1, wherein each communication parameter set of the plurality of communication parameter sets indicates one or more of a timing parameter, communication resources, a power control parameter, one or more communication beams, reference signal parameters, random access parameters, bandwidth part parameters, or control resource parameters.

11. An apparatus for wireless communications at a user equipment (UE), comprising:
a processor; and
a memory coupled with the processor and storing instructions operable, when executed by the processor, to cause the apparatus to:
perform an access procedure to connect with a network comprising a set of wireless network nodes;
receive a communication parameter message indicating a plurality of communication parameter sets in accordance with performing the access procedure, each communication parameter set being associated with a single respective connection mode of a plurality of connection modes, each connection mode being associated with a respective subset of wireless network nodes of the set of wireless network nodes;
receive signaling configuring the UE to use a first connection mode of the plurality of connection modes; and
communicate with a first subset of wireless network nodes of the set of wireless network nodes, according to a communication parameter set associated with the first connection mode, in accordance with receiving the signaling, the first subset of wireless network nodes being associated with the first connection mode.

12. The apparatus of claim 11, wherein:
the set of wireless network nodes includes one or more base stations and one or more assisting nodes; and
the one or more assisting nodes include one or more repeaters, relays, or reflectors.

13. The apparatus of claim 11, wherein:
the communication parameter message is received from a first wireless network node of the set of wireless network nodes; and
the signaling is received from a second wireless network node of the set of wireless network nodes.

14. The apparatus of claim 11, wherein:
each connection mode of the plurality of connection modes is further associated with a single respective index of a plurality of indices;
the signaling indicates the single respective index associated with the connection mode; and
the method further comprises determining the connection mode in accordance with the single respective index.

15. The apparatus of claim 11, wherein each connection mode of the plurality of connection modes is associated with one or both of:
frequency resources, or
one of uplink transmission resources, downlink transmission resources, or flexible transmission resources.

16. The apparatus of claim 11, wherein:
the signaling is a connection mode message; and
the connection mode message indicates the connection mode.

17. The apparatus of claim 11, wherein:
the signaling is control signaling that indicates a control parameter, and
the method further comprises inferring the connection mode in accordance with the control parameter.

18. The apparatus of claim 11, execution of the instructions further cause the apparatus to transmit a request for an initial connection mode or a connection mode change, wherein the signaling is received in accordance with transmitting the request.

19. The apparatus of claim 11, wherein each communication parameter set of the plurality of communication parameter sets indicates one or more of a timing parameter, communication resources, a power control parameter, one or more communication beams, reference signal parameters, random access parameters, bandwidth part parameters, or control resource parameters.

20. A method for wireless communication by a base station, comprising:
receiving, from a user equipment (UE), an access request for access to a network comprising a set of wireless network nodes;
transmitting, to the UE, a communication parameter message indicating a plurality of communication parameter sets in accordance with receiving the access request for access, each communication parameter set being associated with a single respective connection mode of a plurality of connection modes, each connection mode being associated with a respective subset of wireless network nodes of the set of wireless network nodes;
transmitting, to the UE, signaling configuring the UE to use a first connection mode of the plurality of connection modes; and
communicating, with the UE, according to a communication parameter set associated with the first connection mode, in accordance with transmitting the signaling, the base station being included in the subset of wireless network nodes associated with the first connection mode.

21. The method of claim 20, wherein:
the set of wireless network nodes includes the base station and one or more assisting nodes; and
the one or more assisting nodes include one or more repeaters, relays, or reflectors.

22. The method of claim 20, wherein:
each connection mode of the plurality of connection modes is further associated with a single respective index of a plurality of indices; and
the signaling indicates the single respective index associated with the connection mode.

23. The method of claim 20, wherein each connection mode of the plurality of connection modes is associated with one or both of:
frequency resources, or
one of uplink transmission resources, downlink transmission resources, or flexible transmission resources.

24. The method of claim 20, wherein the signaling is a connection mode message that indicates the connection mode.

25. The method of claim 20, wherein:
the signaling is control signaling that indicates a control parameter, and
the control parameter is associated with the connection mode.

26. The method of claim 20, further comprising receiving a connection mode request for an initial connection mode or a connection mode change, wherein the signaling is transmitted in accordance with receiving the connection mode request.

27. The method of claim 20, wherein each communication parameter set of the plurality of communication parameter sets indicates one or more of a timing parameter, communication resources, a power control parameter, one or more communication beams, reference signal parameters, random access parameters, bandwidth part parameters, or control resource parameters.

28. An apparatus for wireless communications at a base station, comprising:
   a processor; and
   a memory coupled with the processor and storing instructions operable, when executed by the processor, to cause the apparatus to:
      receive, from a user equipment (UE), an access request for access to a network comprising a set of wireless network nodes;
      transmit, to the UE, a communication parameter message indicating a plurality of communication parameter sets in accordance with receiving the access request for access, each communication parameter set being associated with a single respective connection mode of a plurality of connection modes, each connection mode being associated with a respective subset of wireless network nodes of the set of wireless network nodes;
      transmit, to the UE, signaling configuring the UE to use a first connection mode of the plurality of connection modes; and
      communicate, with the UE, according to a communication parameter set associated with the first connection mode, in accordance with transmitting the signaling, the base station being included in the subset of wireless network nodes associated with the first connection mode.

29. The apparatus of claim 28, wherein:
   the set of wireless network nodes includes the base station and one or more assisting nodes; and
   the one or more assisting nodes include one or more repeaters, relays, or reflectors.

30. The apparatus of claim 28, wherein:
   each connection mode of the plurality of connection modes is further associated with a single respective index of a plurality of indices; and
   the signaling indicates the single respective index associated with the connection mode.

* * * * *